United States Patent

[11] 3,584,661

| [72] | Inventor | James H. Riesenberg<br>Amherst, N.Y. |
|---|---|---|
| [21] | Appl. No. | 877,068 |
| [22] | Filed | Nov. 17, 1969 |
| [45] | Patented | June 15, 1971 |
| [73] | Assignee | Consolidated Packaging Machinery<br>Corporation<br>Buffalo, N.Y. |

[54] PURGING MACHINE
12 Claims, 9 Drawing Figs.

[52] U.S. Cl. ................................................. 141/61,
141/63, 141/296, 141/302
[51] Int. Cl. ................................................. B65b 31/00
[50] Field of Search........................................... 141/4, 8,
48, 49, 50, 51, 54, 56, 59, 61, 66, 91, 92, 105,
291—296, 302, 305, 144—152, 63, 392

[56] References Cited
UNITED STATES PATENTS

| 3,105,525 | 10/1963 | Boucher.................... | 141/61 |
| 3,516,455 | 6/1970 | Carter....................... | 141/92 |

Primary Examiner—Houston S. Bell, Jr.
Attorney—Christel & Bean

ABSTRACT: A machine for evacuating and purging food containers with nitrogen prior to the product filling operation. A rotatable turret is provided with a plurality of head assemblies, each of which is vertically aligned with a food container for evacuating and purging the same. Each head assembly is provided with valve means for establishing vacuum communication with the container and valve means for controlling the flow of nitrogen gas to the container after the vacuum communication is interrupted. The separate valve means are actuated by vertical reciprocable movement of the head assembly effected by a single cam and a follower associated with each head assembly.

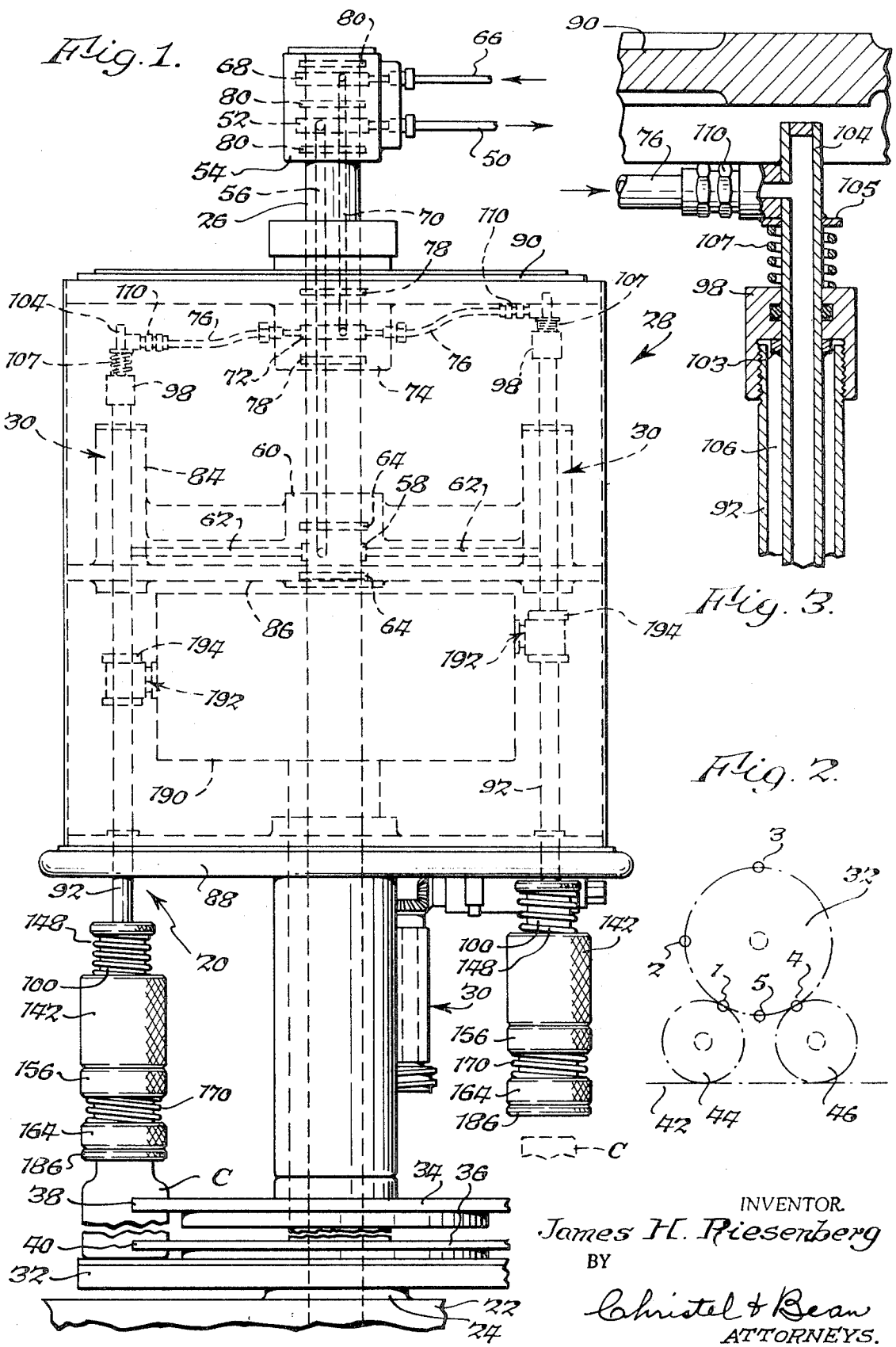

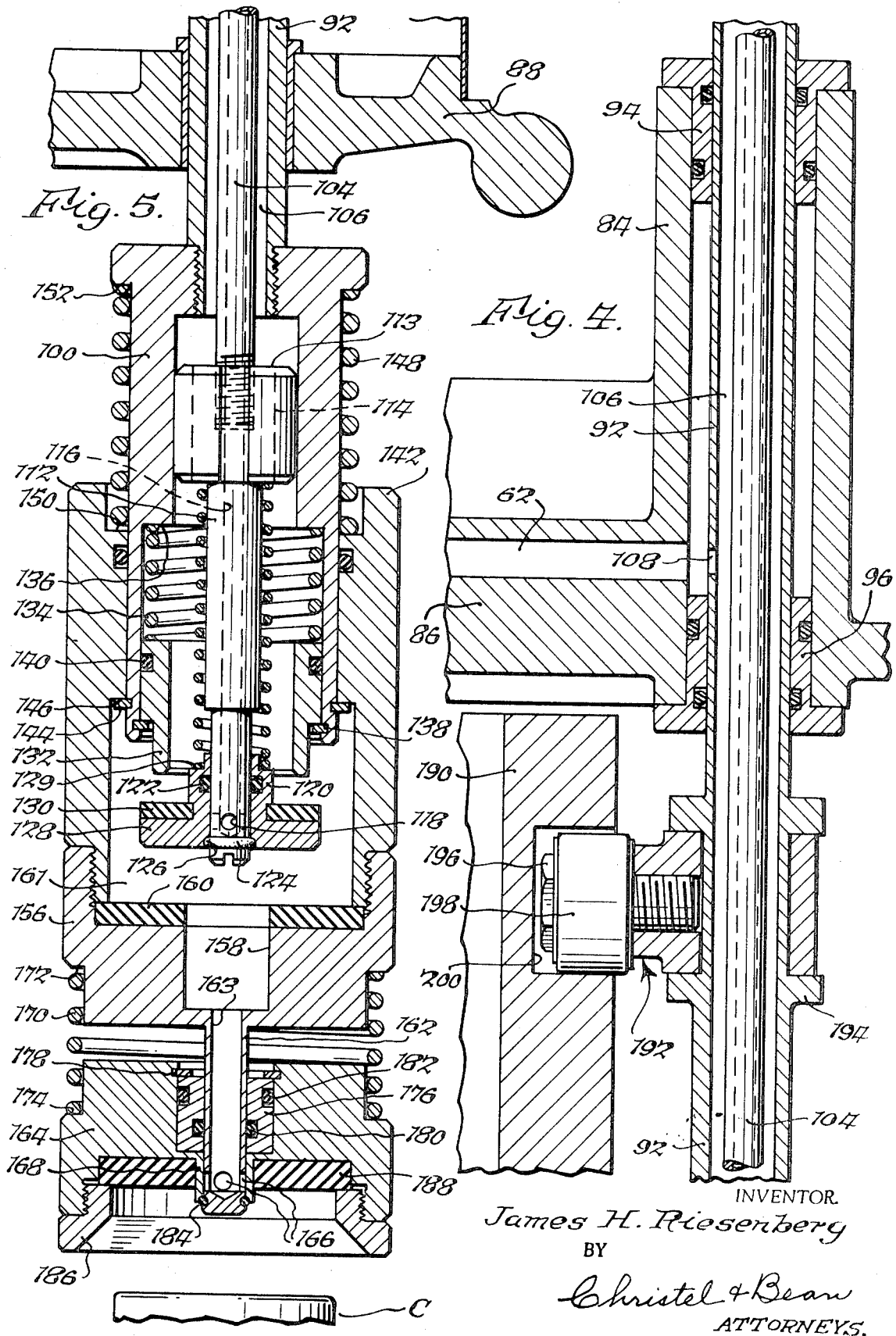

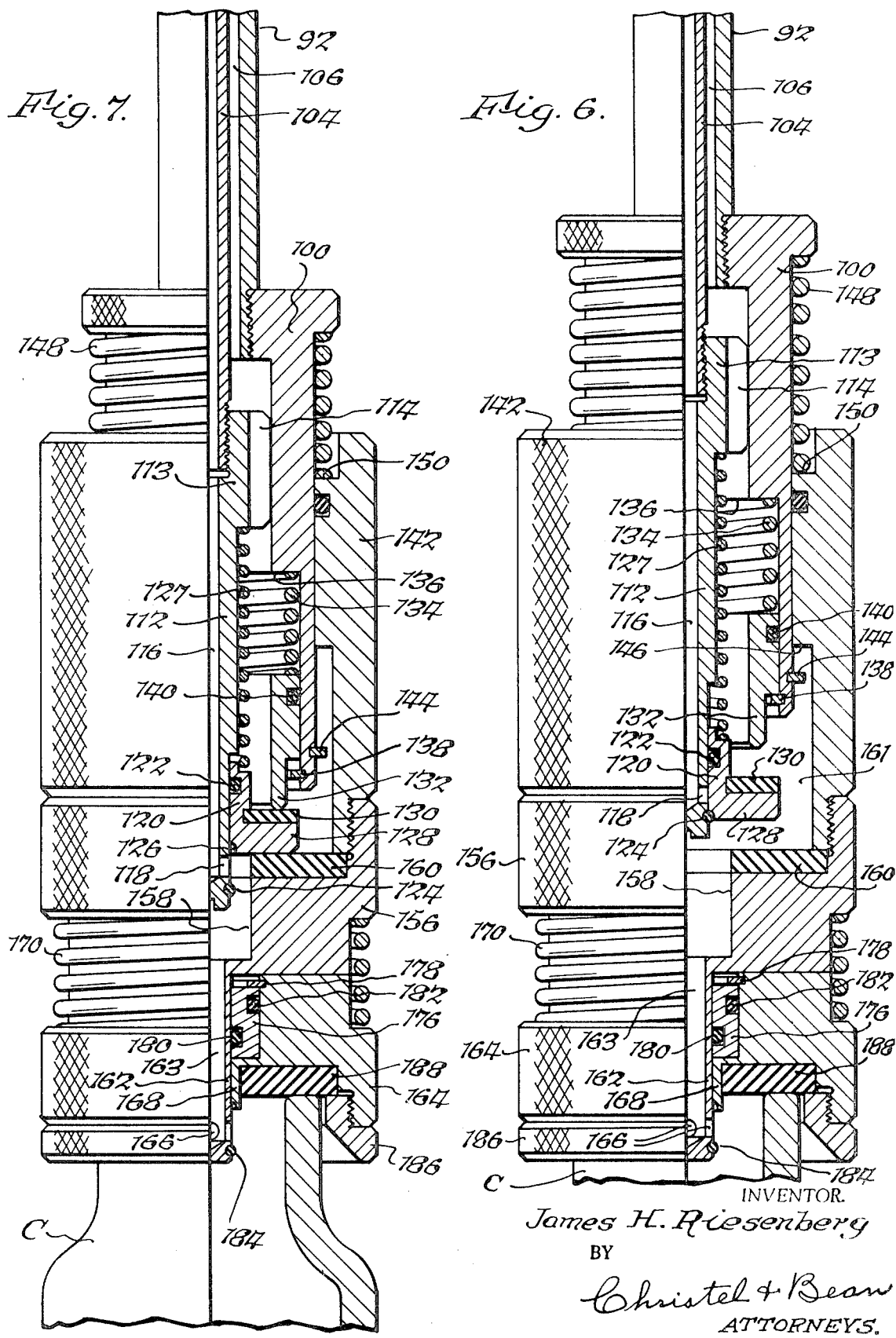

INVENTOR.
James H. Riesenberg
BY
Christel & Bean
ATTORNEYS.

PURGING MACHINE

BACKGROUND OF THE INVENTION

This invention relates to a purging machine and, more particularly, to a machine for evacuating a series of containers and purging them with nitrogen prior to the product-filling operation.

Various techniques have been devised for storing foods and other edible products for indefinite periods of time by dehydration, refrigeration and/or freezing and canning. The latter is perhaps the most common and oldest of these techniques and does not require special attention or care once the edible product is properly enclosed in a fluidtight container to prevent the ingress of contaminants and other foreign substances. Many complex and costly machines have been designed to evacuate such containers to remove bacteria carrying gases therefrom prior to filling with the food product. While many such container-evacuating machines are admirably suited for their intended purpose, they possess certain disadvantages. Besides being expensive and complex in construction in order to perform efficiently in an automated operation, they cannot effect a perfect vacuum in the container so that a small amount of gas, such as oxygen for example, remains in the container. Generally, these small amounts of oxygen are tolerable and will not adversely affect the food products in the containers. However, with some food products, such as edible oils, even a slight amount of oxygen reacts chemically therewith and tends to establish a high peroxide count, thereby discoloring such edible oils and reducing the shelf life thereof.

SUMMARY OF THE INVENTION

It is an object of the present invention to provide a purging machine for automatically evacuating a series of containers and purging the same with nitrogen prior to a product-filling operation.

It is another object of this invention to accomplish the foregoing with a purging machine which is relatively inexpensive, simple and strong in construction, thoroughly reliable in use, and which employs a number of valves disposed within each revolving head assembly operative upon vertical reciprocating movement only.

It is a further object of the present invention to provide the foregoing machine with a simple cam and follower arrangement for effecting operation of all such valves in a timed, sequential cycle upon lowering and raising of the head assembly.

In one aspect thereof, a purging machine constructed in accordance with this invention is characterized by the provision of a single cam controlling the raising and lowering of a series of purging head assemblies each having a plurality of valves for effecting evacuation of food containers and the purging of same with nitrogen prior to the food product-filling operation, said valves being actuated by the lowering and raising of their associated purging head assembly.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 1 is a fragmentary, side elevational view showing a purging machine incorporating the container evacuating and purging means of this invention, parts being deleted for ease of illustration;

FIG. 2 is a schematic view illustrating the path of travel of a purging head assembly of this invention and the container feeding and discharging arrangement associated with this invention;

FIGS. 3 through 5 constitute a composite vertical sectional view, on an enlarged scale, showing one of the purging head assemblies of this invention; and FIGS. 6—9 are fragmentary vertical sectional view, partly in elevation and on an enlarged scale, showing successive positions of a purging head assembly illustrating the relative positions of the movable parts thereof.

DETAILED DESCRIPTION OF A PREFERRED EMBODIMENT

Figure 9:
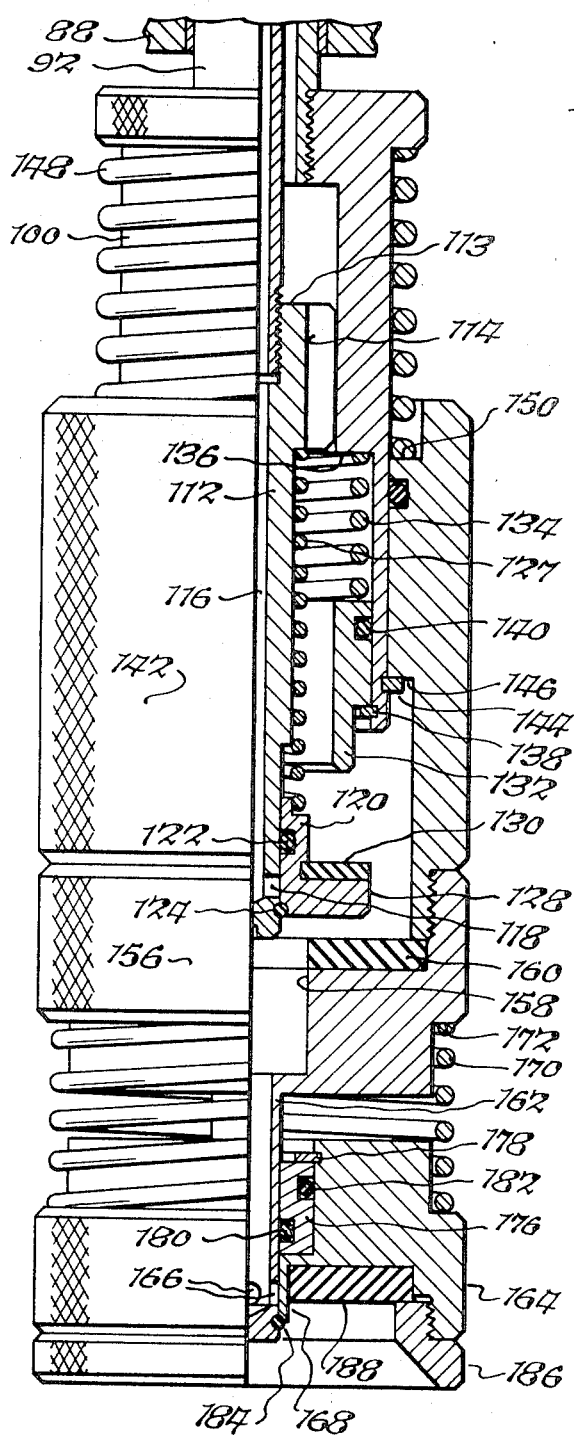

Referring now in detail to the illustrative embodiment depicted in the accompanying drawings, there is shown in FIG. 1 a purging machine constructed in accordance with this invention and generally designated 20 incorporating means for evacuating a container C and purging the same with nitrogen prior to the product-filling operation. The machine has a base 22 provided with an embossment 24 through which an upstanding standard 26 extends. A turret, generally designated 28, is mounted on standard 26 for rotation thereabout and carries a plurality of exhaust and purging head assemblies 20, hereinafter more fully described.

An annular baseplate 32 serves as a support for containers C, which may be cans or bottles for example, and is rotatably disposed on boss 24. A pair of vertically spaced star wheels 34 and 36 are rotatably mounted about standard 26 for movement with baseplate 32 and are provided with teeth 38 and 40, respectively, projecting radially outwardly from the respective star wheels for holding containers C therebetween and conveying them through a series of positions diagrammatically illustrated in FIG. 2. It should be understood that the base and machine frame are shown only fragmentarily and that the specific power and drive train for rotating turret 28 is deleted to avoid confusion and to more clearly illustrate the invention. The drive arrangement and the means for conveying containers C to and from base support plate 32 are well known and form no part of the invention per se. Reference may be had to U.S. Pat. No. 3,054,240 for details of the container conveying means and for the turret-rotating mechanism. It is believed that the diagrammatic showing of these container conveying means illustrated in FIG. 2 will suffice for purposes of this description.

As diagrammatically illustrated in FIG. 2, empty containers are fed to the machine on a conveying flight 42 at properly spaced intervals under control of a worm, not shown but well known in the art, to an infeed star wheel 44 which carries the containers onto the container supporting platform or annular baseplate 32. Containers C are carried around standard 26 by star wheels 34 and 36 through a series of stations identified by numerals 1—4, whereat certain evacuating and purging operations take place and then are discharged by an outfeed star wheel 46 onto conveying flight 42 and ultimately to a product-filling machine.

Turret 28 includes a plurality of head assemblies 30, equal in number to the number of containers C supported on annular baseplate 32, being generally vertically aligned therewith. Although only five positions for head assemblies 30 are identified in FIG. 2, it should be appreciated that head assemblies 30 pass through a series of intermediate stations and any desired number of such head assemblies can be carried by turret 28 with a corresponding number of containers C supported on baseplate 32. Each head assembly 30 is connected to a vacuum line and a nitrogen supply line in the following manner.

Referring to FIG. 1, a vacuum line 50 is connected at one end to a source of vacuum (not shown) and at the other end to an annular passage 52 encircling standard 26 in a housing 54. Annular passage 52 communicates with a passage 56 disposed within standard 26 and extending lengthwise thereof to an annular passage 58 in a distribution housing 60 located substantially centrally of turret 28. Passage 58 communicates with a plurality of conduits 62 leading to and having constant communication with head assemblies 30. O-ring seals 64 are disposed in housing 60 about standard 26 in spaced relation above and below passage 58 to provide pressure sealing and prevent the ingress of gas thereto. The terms upper, lower, upwardly, downwardly, top, bottom, and the like, as used herein, are applied only for convenience of description with reference to the drawings and should not be taken as limiting the scope of this invention.

In a similar manner, a nitrogen supply line 66 is connected at one end thereof to a suitable source of nitrogen under pressure and at the other end to an annular passage 68 in housing 54. Annular passage 68 communicates with a passage 70 extending lengthwise within standard 26 and connected to an annular passage 72 in a distribution housing 74 located in the upper portion of turret 28. A plurality of conduits 76 leading to head assemblies 30 and having constant communication therewith are connected to annular passage 72. O-ring seals 78 are disposed in housing 74 about standard 26 above and below annular passage 72 to prevent the escape of gas. O-ring seals 80 are also employed in housing 54 on opposite sides of passages 52 and 68 to provide pressure sealing therebetween. With such an arrangement, rotation of turret 28 relative to standard 26 can be effected while maintaining a fluidtight relation between the various vacuum and nitrogen connections.

Since the various head assemblies 30 are identical in construction and operation, only one thereof will be described in detail. FIGS. 3, 4 and 5 represent a composite view of a typical head assembly 30 with FIG. 3 illustrating the upper end, FIG. 4 the intermediate portion and FIG. 5 the lower end portion of head 30. FIGS. 5, 6, 7, 8 and 9 correspond to positions 1, 2, 3, 4 and 5 of FIG. 2. Each head assembly 30 comprises a housing 84 (FIG. 4) carried adjacent the periphery of a spindle plate 86 located centrally of turret 28 intermediate a lower plate 88 and an upper plate 90 which form parts of turret 28 and rotate therewith. A vertical tube 92 extends through housing 84 and is reciprocable in vertically spaced sleeves 94 and 96 provided at the upper and lower ends of housing 84. The upper end of tube 92 is threaded into a capnut 98 spaced below upper plate 90. The lower end of tube 92 projects downwardly through lower plate 88 and is threadably secured into a vertically reciprocable sleeve member 100.

An upright inner tube 104 is mounted within outer tube 92 for reciprocable movement relative therewith and extends axially outwardly of the ends of tube 92. The annular space between inner and outer tubes 104 and 92 respectively, defines a tubular passage 106 communicating with vacuum conduit 62 by means of an opening 108 in the wall of outer tube 92. The upper end of inner tube 104 passes through capnut 98 and is connected to nitrogen supply conduit 76 by means of a suitable coupling 110. The lower end of tube 104 is threaded into the upper end of a tubular valve 112. A collar 103 is provided on tube 104 for engagement with capnut 98 to move inner tube 104 axially downwardly with outer tube 92. A second collar 105 is mounted on tube 104 spaced upwardly from capnut 98. A coil spring 107 is disposed about inner tube 104 between nut 98 and collar 105 for urging tube 104 upwardly relative to tube 92 and is limited in such relative upward movement by engagement of collar 103 with nut 98.

Valve 112 is provided with an enlargement 113 at its upper end guided for vertical reciprocating movement within sleeve member 100. Enlargement 113 is fluted as shown at 114 in FIG. 5 to provide communication between tubular passage 106 and the interior of sleeve member 100. An axial passage 116 is provided in valve 112 extending from inner tube 104 to a plurality of passages 118 extending radially outwardly from passage 116 adjacent the lower end of valve 112.

A valve body 120 is telescopically received on tubular valve 112 and normally closes openings 118 to block the escape of nitrogen gas from passage 116. A suitable O-ring 122 provides pressure sealing between tubular valve 112 and valve body 120. Valve body 120 is suspended on tubular valve 112 by means on an O-ring 124 mounted in a peripheral groove adjacent the end of tubular valve 112 and adapted to engage a beveled should 126 of valve body 120 for restraining downward movement thereof relative to tubular valve 112. Valve body 120 is normally maintained in the position shown in FIG. 5 relative to valve 112 under the influence of a spring 127 disposed between the lower end of enlargement 113 and an annular shoulder 129 provided on the upper end of valve body 120. Valve body 120 is provided with an enlargement 128 having a valve seat 130 thereon.

A tubular valve 132 is vertically reciprocable in sleeve member 100 under the influence of a compression spring 134 disposed between the upper end of valve 132 and an abutment shoulder 136 on sleeve member 100. Valve 132 is limited in its downward movement relative to sleeve member 100 by a retaining ring 138 and is urged thereagainst by spring 134. A suitable O-ring seal 140 provides pressure sealing between valve 132 and sleeve member 100.

Sleeve member 100 is telescopically received in an outer sleeve member 142 and is releasably held therein by a snap ring 144 which also serves to restrict axial outward movement of sleeve member 100 relative to outer sleeve member 142 by means of a radially inwardly directed abutment shoulder 146 formed integral with outer sleeve member 142. A compression spring 148 is disposed between a recessed shoulder 150 of outer sleeve member 142 and an annular flange 152 on inner sleeve member 100 for normally urging said sleeve members apart.

The lower end of outer sleeve member 142 is threaded onto a cap member 156 having a central opening 158 therein surrounded by a resilient valve seat 160. The inner wall of sleeve member 142 together with seat 160 defines a chamber 161 for housing the lower portion of valve 112 and valve body 120. The lower end of cap member 156 is provided with an elongated tubular valve 162 projecting downwardly through a chuck 164 and having an axial passage 163 therein extending from opening 158 to laterally extending passages 166 normally closed by an axial extension 168 extending downwardly from chuck 164. A compression spring 170 is seated at its opposite ends against annular shoulders 172 and 174 of cap member 156 and chuck 164 respectively, to urge the same in a spaced-apart relation.

Valve 162 is vertically reciprocable in a sleeve 176 releasably held in chuck 164 by a snap ring 178. Suitable O-ring seals 180 and 182 are disposed about valve 162 and sleeve 176, respectively, to provide pressure sealing therebetween. The lower end of valve 162 is provided with a peripheral groove for accommodating an O-ring seal 184 which abuts the lower beveled end of extension 168 and maintains chuck 164 suspended on valve 162.

A centering bell 186 is carried by chuck 164 for engaging containers adjacent the neck thereof to center the same relative to valve 162, in a manner known in the art. An annular resilient sealing gasket 188 is disposed in the inner end of chuck 164 about extension 168 for engaging the top of the container in a fluidtight relation.

Head assemblies 30 are adapted to be reciprocated vertically and all valve functions are effected by relative vertical axial movement of the various parts as hereinafter described. Vertical reciprocating movement of head assemblies 30 is effected by a cylindrical cam 190 (FIGS. 1 and 4) fixedly mounted on the machine frame within turret 28 between intermediate plate 86 and lower plate 88 and a cam follower 192 associated with each head assembly 30. As shown in FIG. 4, each cam follower 192 is secured to an enlargement 194 provided on outer tube 92 by a suitable fastener such as a bolt 196 for example. Cam followers 192 are in the form of rollers 196 adapted to ride in a groove 200 extending around the periphery of cylindrical cam 190. Thus, as turret 28 rotates, roller 198 of each head assembly 30 rides in groove 200 of cam 190 and follows the upward and downward path thereof to impart a corresponding movement to head assembly 30.

The mode of operation will be described with reference to FIGS. 5—9 which correspond to positions 1—5, respectively, shown in FIG. 2 of one head assembly as it is rotated in a circular path by turret 28. FIG. 5 illustrates the elevated position of head assembly 30 as a container C is fed onto annular baseplate 32 by infeed star wheel 44. As turret 28 rotates, cam follower 192 is lowered carrying along with it outer tube 92 of head assembly 30. The engagement of capnut 98 with collar 103 of inner tube 104 carries tube 104 downwardly along with outer tube 92. Downward movement is transmitted to centering bell 186 via outer tube 92, sleeve member 100, compression spring 148, outer sleeve member 142, cap member 156, compression spring 170 and chuck 164 causing centering bell 186 to move down and engage the neck of container C with gasket 188 pressed against the open end thereof to provide a fluidtight relation.

Upon further downward movement of head assembly 30, cap member 156 moves axially downwardly relative to chuck 164 against the bias of spring 170 until cap member 156 engages chuck 164. This relative axial movement lowers valve 162 relative to extension 168 into the top of container C and exposes passages 166 to the interior of container C as shown in FIG. 6. Thus, the interior of container C is evacuated via passage 166, passage 163, opening 158, chamber 161, valve 132, flutes 114, tubular passage 106, opening 108 and vacuum line 62 to withdraw any contaminated or bacteria-carrying gases from container C prior to the purging operation.

Upon further downward movement of tube 92 effected by cam 190 and cam follower 192, sleeve member 100 moves vertically downwardly relative to sleeve member 142 against the bias of spring 148. Sleeve member 100 compresses spring 134, which in turn urges valve 132 against valve seat 130 to block vacuum communication between chamber 161 and the interior of sleeve member 100. Further downward movement of valve 132 urges valve body 120 downwardly until enlargement 128 of valve body 120 engages valve seat 160 and is prevented from further downward movement thereby. Valve 112 continues to move vertically downwardly relative to valve body 120 by means of downward movement of tube 92 and inner tube 104 thereby inserting the lower end of valve 112 in opening 158 and exposing passages 118 as shown in FIG. 7. It should be noted that valve 162 remains in its lowered position inserted in container C with passages 166 in communication with the interior of container C. Nitrogen gas is then supplied to the interior of container C via nitrogen line 76, inner tube 104, passage 116 of valve 112, passages 118 opening 158, passage 163 and passages 166. Nitrogen gas is supplied at a pressure slightly above atmospheric pressure so that such nitrogen gas will be retained in containers C during subsequent transfer to the product filling and capping or closing stations.

Figure 8:
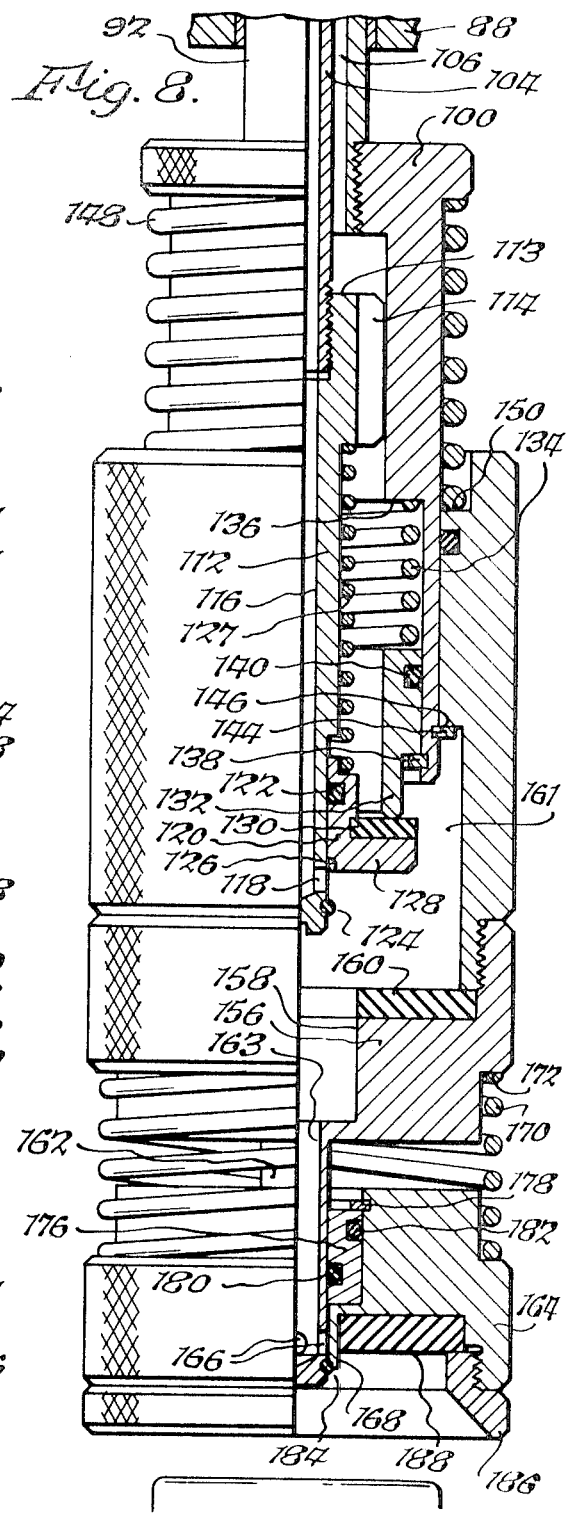

As turret 28 continues to rotate, cam follower 192 is raised imparting upward movement to head assembly 30 by means of outer tube 92 which raises sleeve member 100 relative to sleeve member 142 until snap ring 144 engages abutment shoulder 146 of sleeve member 142 and retracts the same upwardly. Engagement of retaining ring 138 with an annular shoulder on valve 132 carries said valve 132 upwardly with sleeve member 100. The force of nitrogen gas under pressure acting on the larger undersurface area of enlargement 128 is greater than the net force of such pressure acting on the upper surface thereof and spring 127 to maintain valve body 120 in engagement with valve 132 during its upward travel. Valve 112 is also carried upwardly by means of nut 98 compressing spring 107, which in turn urges collar 105 and the associated inner tube 104 upwardly. Simultaneously, cap member 156 moves upwardly with sleeve member 142 and away from chuck 165 due to the expansion of spring 170 to withdraw the lower end of tubular valve 162 from container C and move the same axially upwardly relative to extension 168 to close passages 166, thereby blocking the flow of nitrogen gas through the end of tubular valve 162 as shown in FIG. 8. With restoration of spring 170 and with O-ring 184 in engagement with the beveled end of extension 168, chuck 164 is carried upwardly with cap member 156 withdrawing centering bell 186 from container C, which is now in position 4 of FIG. 2 and can be removed from baseplate 32 by outfeed star wheel 46. It should be noted that the relative position of tubular valve 112 and valve body 120 remains the same during a portion of the upward movements thereof so that passages 118 of tubular valve 112 are still exposed at this time and nitrogen is present up to the lower end of tubular valve 162. The nitrogen gas under pressure in chamber 161 acting against the underside of valve body 120 together with the suction force acting on the upper side of valve body 120 urges valve seat 130 against valve 132 and causes it to ascend upwardly therewith as shown in FIG. 8.

Upon further upward movement of head assembly 30 by means of cam 190 and follower 192, the upper end of inner tube 104 engages plate 90 (FIG. 3) and is restrained against further upward movement, causing outer tube 92 to move upwardly relative thereto carrying sleeve member 100 upwardly, which in turn lifts valve 132 therewith. The downward force of compressed spring 127 now overcomes the upward force resulting from nitrogen gas under pressure acting against the lower surface of valve body 120 as well as the suction force acting on the upper surface of valve body 120 to restrain upward movement of valve body 120 and allows valve 132 to disengage from valve seat 130 thereby establishing communication between the vacuum source and chamber 161 to rapidly dump the gas pressure therein. As a result, valve body 120 is lowered relative to tubular valve 112 closing off passages 118 and blocking the flow of nitrogen gas. As outer tube 92 continues to move upwardly, it carries sleeve members 100 and 142 therewith relative to tubular valve 112 and valve body 120 to the position shown in FIG. 9 which corresponds to the head assembly position 5 in FIG. 2.

As turret 28 continues to rotate, follower 192 is guided in a downwardly inclined path imparting downward movement to outer tube 92 and the entire head assembly 30 to bring sleeve member 142, cap members 156 and chuck 164 to the position shown in FIG. 5 whereby the head assembly 30 is vertically aligned with another container C to be evacuated and purged. During this movement sleeve members 100 and 142 are lowered relative to tubular valve 112 and valve body 120 from the relative positions shown in FIG. 9 to the relative positions shown in FIG. 5 in readiness for the next cycle.

From the foregoing, it is apparent that the objects of the present invention have been fully accomplished. As a result of the present invention, a machine is provided for evacuating and purging food containers in an improved and more efficient manner. By providing means for purging such containers with nitrogen, food products are precluded from attack by oxygen thereby extending the shelf life thereof for a virtually indefinite time.

A preferred embodiment of this invention having been described in detail, it should be understood that this has been done by way of illustration only.

I claim:

1. A head for a container purging machine comprising: means for reciprocating said head along an axis; sealing means on said head engageable with the open end of a container; a chamber in said head; an opening through said sealing means in communication with said chamber; said opening having an outlet means; means normally connecting said chamber to a source of vacuum; first valve means in said chamber controlling communication between said chamber and said vacuum source; means connecting said chamber to a source of purging gas under pressure; second valve means controlling communication between said chamber and said source of purging gas; means normally closing said outlet means; and means responsive to a predetermined movement of said head along said axis for exposing said outlet means and thereby establishing communication between an engaged container and said vacuum source.

2. A head according to claim 1 wherein said first valve means comprises a first tubular valve and a valve body having a valve seat, said first tubular valve engageable with said valve body seat upon further predetermined movement of said head along said axis beyond said first-mentioned predetermined movement to interrupt communication between said chamber and said vacuum source.

3. A head according to claim 2 wherein said first valve means also comprises a valve seat engageable by said valve body upon still further movement of said head along said axis beyond said further predetermined movement to prevent any further movement of said valve body along said axis.

4. A head according to claim 3 wherein said second valve means comprises a second tubular valve mounted within said valve body for reciprocable movement relative thereto along said axis, said second tubular valve having an outlet normally closed by said valve body, said second tubular valve being moved axially relative to said valve body upon movement of said head along said axis beyond said last-mentioned still further movement thereof to expose said second valve outlet and establish communication between said source of purging gas and an engaged container.

5. A head according to claim 1 wherein said reciprocating means comprises a cam having a peripheral groove and a cam follower connected to said head and guided for reciprocable movement in said groove.

6. A head according to claim 1 wherein said head includes a member supporting said outlet means, and a chuck for mounting said sealing means and said closing means therein and axially movable relative to said member to permit relative axial movement between said closing means and said outlet means.

7. A head according to claim 1 wherein said means connecting said chamber to a source of vacuum comprises an elongated outer tube having an opening therein, a conduit connecting said opening to a source of vacuum, and passage means connecting said outer tube to said chamber.

8. A head according to claim 1 wherein said means connecting said tube to a source of purging gas comprises an inner tube connected at one end thereof to said second valve means, and a conduit connecting the other end of said inner tube to said source of purging gas.

9. A head according to claim 1 wherein said purging gas is nitrogen.

10. A plurality of heads as defined in claim 1 in combination with a container purging machine having a rotary container supporting plate and a rotary turret, said heads mounted on said turret for rotation therewith and spaced vertically from said container-supporting means, and means for positioning successive containers on said supporting plate in substantial vertical alignment with said heads.

11. A valve assembly for a container-purging machine comprising concentric inner and outer tubular valve members, said inner tubular valve member having an inlet connected to a source of purging gas and an outlet, said outer tubular valve member having an inlet connected to a source of vacuum and an outlet, a valve body cooperable with said inner and outer tubular valve members, said valve body normally closing said inner tubular valve member outlet and having a seat engageable by said outer tubular valve member upon a predetermined axial movement thereof for closing said outer tubular valve member outlet, and means for moving said outer tubular valve member axially into engagement with said seat.

12. A valve assembly as set forth in claim 11 together with means for moving said inner tubular valve member axially relative to said valve body to expose said inner tubular valve member outlet.